Patented June 26, 1934

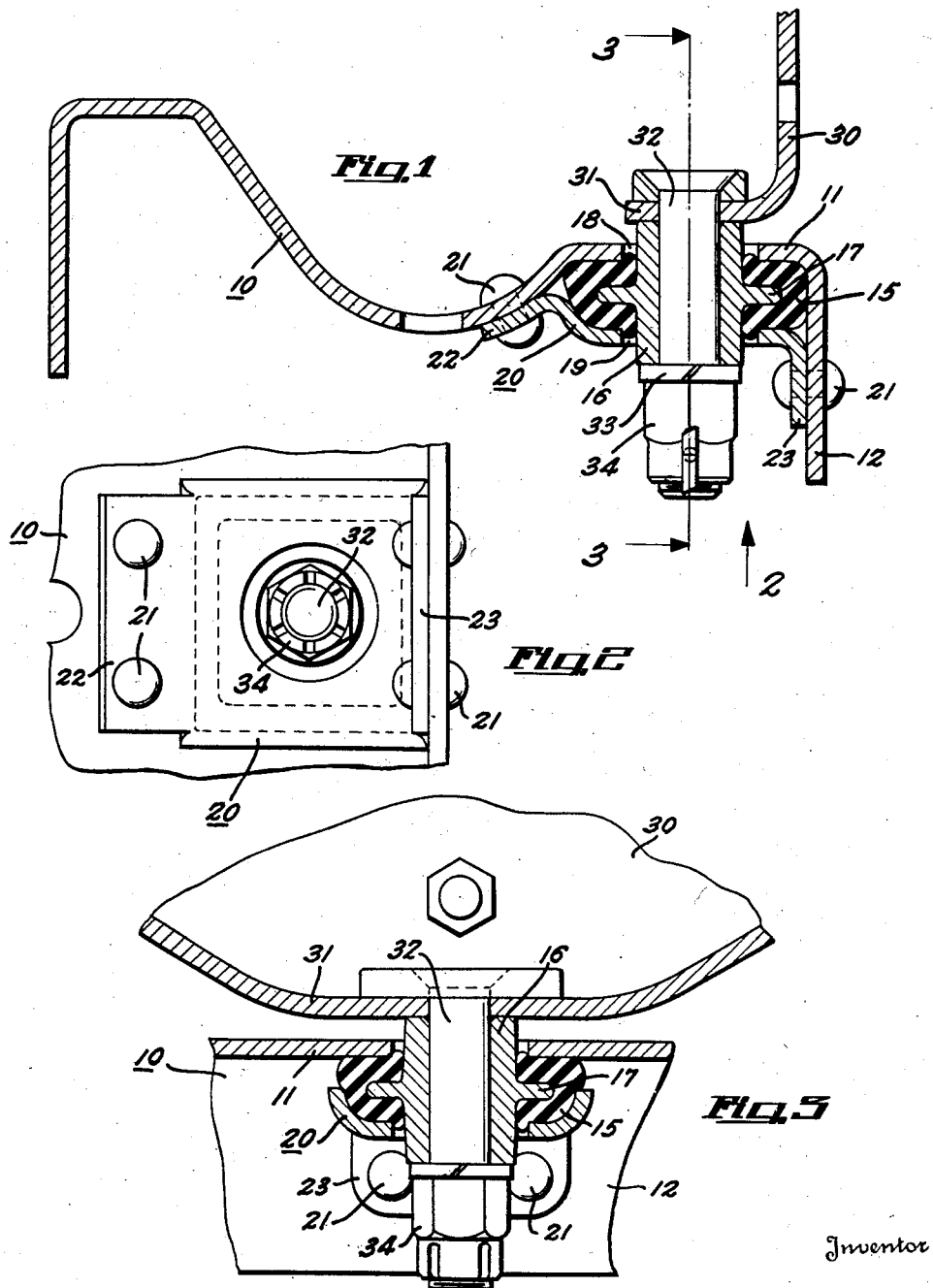

1,964,432

UNITED STATES PATENT OFFICE 1,964,432

RESILIENT ENGINE MOUNT

Harvey D. Geyer, Dayton, Ohio, assignor, by mesne assignments, to General Motors Corporation, Detroit, Mich., a corporation of Delaware Application July 30, 1932, Serial No. 626,992

4 Claims. (Cl. 248—14.2)

This invention relates to a metal-isolating resilient support especially adapted for supporting an automobile engine upon the chassis frame. Initially compressed resilient rubber engine mounts for automobiles are now well known, however, their proper and best functioning is very often prevented due to the fact that when the engine is assembled upon the chassis the resilient rubber is not adjusted to the correct compression for which the rubber mount was designed. In all cases where the rubber is put under its initial compression at the time the engine is installed upon the chassis it is practically impossible to obtain uniformity in degree of compression upon the rubber and hence different cars of exactly the same design vary greatly in the disturbing effect of engine vibration.

An object of this invention is to provide a simple yet efficient resilient engine mount wherein the resilient rubber is initially compressed to the exact desired degree when the mount is assembled to the chassis frame member, and wherein the engine may be thereafter easily attached or detached from the mount without disturbing the compression on the rubber.

A more specific object is to provide such an engine mount to which the engine may be attached by the simple means of a hold-down bolt.

A particular object is to provide such a resilient engine mount for the front end of the engine which is permanently incorporated with the front cross-member of the chassis frame, whereby the construction is simplified and a minimum of space useful for other parts occupied by said mount.

Further objects and advantages of the present invention will be apparent from the following description, reference being had to the accompanying drawing, wherein a preferred embodiment of one form of the present invention is clearly shown.

In the drawing:

Fig. 1 is a vertical section through the center line of a front engine mount according to this invention and shows its relation to the frame cross-member and the engine.

Fig. 2 is a bottom view looking in direction of the arrow 2 of Fig. 1.

Fig. 3 is a section on line 3—3 of Fig. 1.

Similar reference characters refer to similar parts throughout the several views.

The front cross-member 10 of the chassis frame has a horizontal portion 11 and a depending flange 12 thereon which are utilized by this invention to partially encase and confine the resilient rubber block 15 as clearly shown in Fig. 1. This resilient rubber block 15 is molded approximately to the form shown and is preferably vulcanized in place upon the isolated metal sleeve 16 which has an integral horizontal flange 17 of substantial area embedded in the rubber. This unit comprising metal sleeve 16 and rubber block 15 is located in its proper position adjacent the under side of cross-member 10 with the upper end of sleeve 16 projecting through the hole 18 therein, and then the cupped metal bracket 20 permanently fixed in place by the rivets 21 extending through the flanges 22 and 23. When the metal cup 20 is forced into contact with the cross-member 10 the rubber block 15 is put under the exact desired initial compression, which compression causes the rubber to bulge out somewhat at the annular clearance openings 18 and 19 (see Fig. 1) and above the lateral edges of the cup 20 (see Fig. 3). It will now be clear that the metal sleeve 16 is permanently secured in place to the cross-member 10 but is resiliently isolated therefrom by the resilient rubber block 15. It is capable of relative oscillation in all directions and hence when the engine is rigidly fixed thereto the engine may vibrate in any direction while the resilient block 15 prevents the transmission of such vibrations to the chassis frame.

A member 30 on the front end of the engine has a horizontal flange 31 which rests upon the upper end of the isolated sleeve 16 and is rigidly fixed thereto by the hold-down bolt 32, lock washer 33 and nut 34. It is thus seen that the engine may be easily and very simply attached or detached from the front cross-member 10 without disturbing in any way the initial compression on the resilient rubber block 15. It is also obvious that the resilient engine support of this invention is substantially entirely located under the frame cross-member 10 and so occupies no space which is necessary or useful for other engine parts, such as the manual starting crank or the projecting end of the crank shaft which engages the starting crank.

Preferably the parts 15, 16, and 20 are permanently attached to cross-member 10 by the rivets 21 prior to said cross-member 10 being riveted to the chassis side rails but this is not necessary. If desired, bolts and nuts may be substituted for the rivets 21.

While the form of embodiment of the present invention as herein disclosed, constitutes a preferred form, it is to be understood that other forms might be adopted, all coming within the scope of the claims which follow.

What is claimed is as follows:

1. In a motor vehicle having a chassis frame and an engine, in combination, a front cross-member for said frame having a vertical hole therethrough, a resilient engine mount substantially entirely located on the under side of said cross-member at said hole therein, said resilient mount comprising: a vertically apertured metal socket aligned with the hole in said cross-member and adapted to receive a hold-down bolt for the engine, a resilient rubber block surrounding and isolating said metal socket from said cross-member, and a metal cup-member fixed to the under side of said cross-member and clamping said rubber block under a predetermined initial compression up against the under side of said cross-member.

2. In a motor vehicle having a chassis frame and an engine, in combination, a front cross-member for said frame having a vertical hole therethrough, a resilient engine mount substantially entirely located on the under side of said cross-member at said hole therein, said resilient mount comprising: a metal socket having an isolating resilient rubber block vulcanized thereupon and clamped up against the under side of said cross-member so as to align said socket member with said hole through said cross-member, and a metal housing-member fixed to said cross-member below said rubber block, said housing-member together with said cross-member forming a substantial protective housing for said rubber block.

3. In combination, a supporting frame member having an angular cross-section such as to provide two sides of a housing for a rubber block, a metal cup fixed to said frame member so as to form a housing for a rubber block, a resilient rubber block clamped under a permanent initial compression in the housing thus formed, said housing having aligned apertures through said frame member and said metal cup, a bolt-receiving metal socket extending through and supported by said rubber block in isolated relation with both said frame member and said metal cup and having portions extending through both of said aligned apertures, whereby a device may be readily bolted to said socket and thus be resiliently supported by said frame member.

4. In an automobile having a chassis frame and an engine, in combination, a rigid front cross member forming a structural part of the chassis frame and having a depending flange at the rear edge thereof, and a metal-isolating front engine mount having a resilient rubber block and a lower housing portion clamped directly to the under side of said cross member adjacent said flange, said cross member forming the upper portion of the housing for said rubber block, whereby said metal-isolating mount is located in a well-protected ordinarily unused space and avoids interference with other engine parts.

HARVEY D. GEYER.